United States Patent [19]
Lazar

[11] Patent Number: 5,818,389
[45] Date of Patent: Oct. 6, 1998

[54] METHOD FOR DETECTING AND LOCATING SOURCES OF COMMUNICATION SIGNAL INTERFERENCE EMPLOYING BOTH A DIRECTIONAL AND AN OMNI ANTENNA

[75] Inventor: Steven Lazar, Los Angeles, Calif.

[73] Assignee: The Aerospace Corporation, El Segundo, Calif.

[21] Appl. No.: 766,723

[22] Filed: Dec. 13, 1996

[51] Int. Cl.$^6$ .................................................. G01S 3/16
[52] U.S. Cl. ........................ 342/383; 342/378; 342/357; 455/278.1
[58] Field of Search .................................... 342/357, 378, 342/380, 383; 455/63, 278.1

[56] References Cited

U.S. PATENT DOCUMENTS 4,204,211  5/1980  Cvelos ................................. 342/380

Primary Examiner—Joseph L. Felber
Attorney, Agent, or Firm—Derrick Michael Reid

[57] ABSTRACT

A communication interference detection method determines the direction toward a source of interference by combining interference signals from a sweeping directional antenna with communication signals from an omni antenna while measuring and recording power, frequency spectra, and interference-to-signal ratio over a wide range of conditions using a spectrum analyzer and power meter and communication receivers. The method can be used in the field to locate interfering sources which might interference with the reception of communication signals such as Global Position System (GPS) communication signals.

9 Claims, 2 Drawing Sheets

METHOD FOR DETECTING AND LOCATING SOURCES OF COMMUNICATION SIGNAL INTERFERENCE EMPLOYING BOTH A DIRECTIONAL AND AN OMNI ANTENNA

STATEMENT OF GOVERNMENT INTEREST

The invention was made with Government support under Contract No. F04701-88-C-0089 by the Department of the Air Force. The Government has certain rights in the invention.

The invention described herein may be manufactured and used by and for the government of the United States for governmental purpose without payment of royalty therefor.

SPECIFICATION

FIELD OF THE INVENTION

The invention relates to the field of interference detection. More particularly, the invention relates to detection of interfering signals disturbing the reception of communication signals, such as those produced by satellites in the Global Position System.

BACKGROUND OF THE INVENTION

Global Positioning System (GPS) operates using satellite signals in the L-band frequencies. The $L_1$ signal is transmitted by the satellite with a 1575.42 MHz carrier frequency. The $L_1$ signal is modulated by two codes, the C/A code and the P code. The $L_2$ signal is modulated uniquely with the P code. The C/A code has a chipping rate of 1.023 MHz. The P code has a chipping rate of 10.23 MHz. The occupied bandwidths of the signals are approximately twice the clock frequencies of the codes, the clock frequency being defined as the chipping rate. Commercial receivers are typically designed to use only the C/A code modulation on $L_1$ for navigation. Military receivers are typically designed to use both the C/A code and the P Codes on $L_1$ and $L_2$. Consequently, commercial receivers typically have front-end sections composed of amplifiers and bandpass filters tuned to one tenth of the bandwidth of the military type receivers. Therefore, commercial receivers filter out more of the radio frequency spectrum wherein sources of interference may be found. The military receivers, on the other hand, use P code which is inherently more resistant to interference.

GPS receivers have long been susceptible to passive interference, that is, interference created by broadcasted signals used for other purposes. GPS receivers are also susceptible to jamming, that is, the broadcasting of interference signals generated for the purpose of interfering with the reception of the GPS signals used in military applications. In both cases, GPS receivers are susceptible to interfering signals. With the growth in the number of military and civilian users of GPS, there is an increased need for the detection and reduction of interfering sources. Interfering Sources have been known to cause dynamic spatial outage volumes in which interfering signals have been so strong that GPS reception has become improbable at various times and in differing amounts. Some sources of GPS interference have been identified only after lengthy trial and error measurement by flight equipment and exhaustive investigative reporting inquiries. Conventional methods to improve reception in the present of interference include antenna-reception beam steering to avoid the reception of interference.

Investigative methods for the detection of interfering sources include volume mapping of GPS outages, measurement of localized electromagnetic power spectral densities, both with corresponding verbal and written inquiries of entities which might be possible interfering sources. Some reported cases of GPS outages have not been resolved to date. There has existed a long felt but unsatisfied need to quickly locate sources of GPS interfering signals. Typically, interference detection systems are limited to spectrum analysis of all received signals, without a means to determine if the received signals do indeed cause interference and reception blockage in the receivers. Also, the mere detection of interference by a detection of reception blockage does not provide an indication as to the direction to the source of interference so that the interfering source can be located.

A GPS outage suspected to be due to interference may actually be due to other factors such as blockage, large initial position or time errors that can preclude initial acquisition, loss of receiver memory that can preclude initial acquisition, operator error that can preclude initial acquisition, or failure in the satellite control system that interrupts or corrupts the GPS signal. During an outage, the problem of interference detection becomes virtually impossible because the GPS receivers can not indicate the presence of interference when they are unable to track GPS satellites. Likewise, when the GPS signal is always received, it is presumed that no GPS interfering signal is present, because no interference signal is sufficiently strong to interfere with the GPS reception. It is only when the GPS interference is sufficient to cause intermittent GPS reception outages, yet insufficient to cause a total GPS reception outage, that GPS interference is known to exist. Intermittent GPS reception indicates both the presence of a GPS signal and the presence of a GPS interfering source. Thus, when a partial intermittent outage condition exists, GPS interference may be presumed to be present and signal detection methods can be employed.

GPS receiver interference can include many types of interference. In-Band interference is caused by a direct in-band microwave signal within the pass band of the GPS receiver. Harmonic interference is caused by a harmonic multiple of the UHF or lower frequency of a transmitted signal. Spillover interference is caused by a strong signal having a frequency near the GPS carrier frequency. Intermodulation interference is caused by the algebraic combination of two signals, the result of which falls within the GPS pass band. Saturation interference is caused by any sufficiently strong signal at any frequency which overdrives the input low noise amplifier or a limiter device intended to clamp the signal at a level below that which can damage equipment. The diversity of possible sources of interference increases the difficulty in determining causes of GPS outages.

There are additional difficulties in isolating the cause of a loss of GPS reception. The inherently weak GPS signal may be typically at −160 dBW at the receiver and consequently a weak interference signal can interfere with GPS reception. A clear line of sight between moving GPS navigation receivers and orbiting GPS satellites may be difficult to maintain at all times. An interfering signal may be strong enough to sufficiently block GPS reception yet be too weak to measure with a spectrum analyzer. Also, various signals from many differing sources from differing directions may be detected at a GPS receiver sight, yet only one them may be a source of interference. One problem associated with multiple potential sources is a determination of which one is the cause of GPS interference. These and other problems and disadvantages are solved or reduced using the present invention.

SUMMARY OF THE INVENTION

An object of the invention is to detect interference and determine the spatial direction toward a source of an interfering signal.

Another object of the invention is to detect interference and determine the spatial direction toward a source of an interfering signal interfering with the reception of a communication signal.

Yet another object of the invention is to detect interference and determine the spatial direction toward a source of interference interfering with the reception of a GPS communication signal.

Still another object of the invention is to detect interference and determine the spatial direction toward and spectral profile of an interfering signal interfering with the reception of a communication signal.

A further object of the invention is to detect interference and determine the spatial direction toward and spectral profile of an interfering signal interfering with the reception of a GPS communications signal.

Yet a further object of the invention is to provide a method and system that receives an interfering signal by a directional antenna used for determining the spatial direction toward a source of interference partially interfering with a communication signal received by an omni antenna.

Still a further object of the invention is to provide a directional antenna for receiving an interfering signal and an omni antenna for receiving a partially interfered communication signal which when coupled together enable the detection of interference and the determination of the spatial direction toward the source of interference.

The interference detection system uses an omni antenna for receiving communication signals and a sweeping directional antenna for receiving a rotationally varying interfering signal which when combined together provide a combined signal that is used for determining the direction of the antenna, and hence the direction toward a source of interference. The source of the interference is in the direction of the directional antenna main beam when the interference signal has a maximum effect upon the reception of the communication signal. Preferably, the directional antenna is a high gain antenna which, when used with a low noise amplifier, power couplers, and splitters enables, the measurement of signal power using a spectrum analyzer and a power meter. The strength of the communication signal received by the omni receiver subjected to possible interference can be measured as well. The interference detection system may be used in the field to determine the spectral characteristics of an interfering signal. The interference detection system can also be preferably used to increase the communication signal received power relative to the interference signal received power for improved reception in the presence of interference.

The invention has general application to communication signals and system and corresponding interference detection. Preferably, a Global Positioning System (GPS) interference detection system is constructed to accurately measure the power, frequency, and spectral profile of a interfering signal over a wide range of conditions. In the preferred form, a GPS omni antenna receives GPS communication signals and a high gain directional antenna is swept to search for the source of an interfering signal. The directional antenna provides a directional signal which may include the interfering signal. The directional signal is combined with the GPS communication signal to provide a combined signal to the receivers and measuring equipment for determining the direction of the directional antenna when the interference effect upon the GPS signal is maximized. The receivers preferably include C/A code and or P code receivers and the measuring equipment preferably include power meters and or spectrum analyzers all interfaced with a monitoring computer system for data display, storage, and processing. The GPS interference detection system can be used to locate sources of interference enabling remedial action to improve the reception of GPS signals and to protect navigation. The detection system is suitable for use by safety inspectors covering airports, harbor and other facilities that rely upon GPS signals for navigation and timing. These and other advantages will become more apparent from the following detailed description of the preferred embodiment.

DETAILED DESCRIPTION OF THE PREFERRED EMBODIMENT

Figure 1:
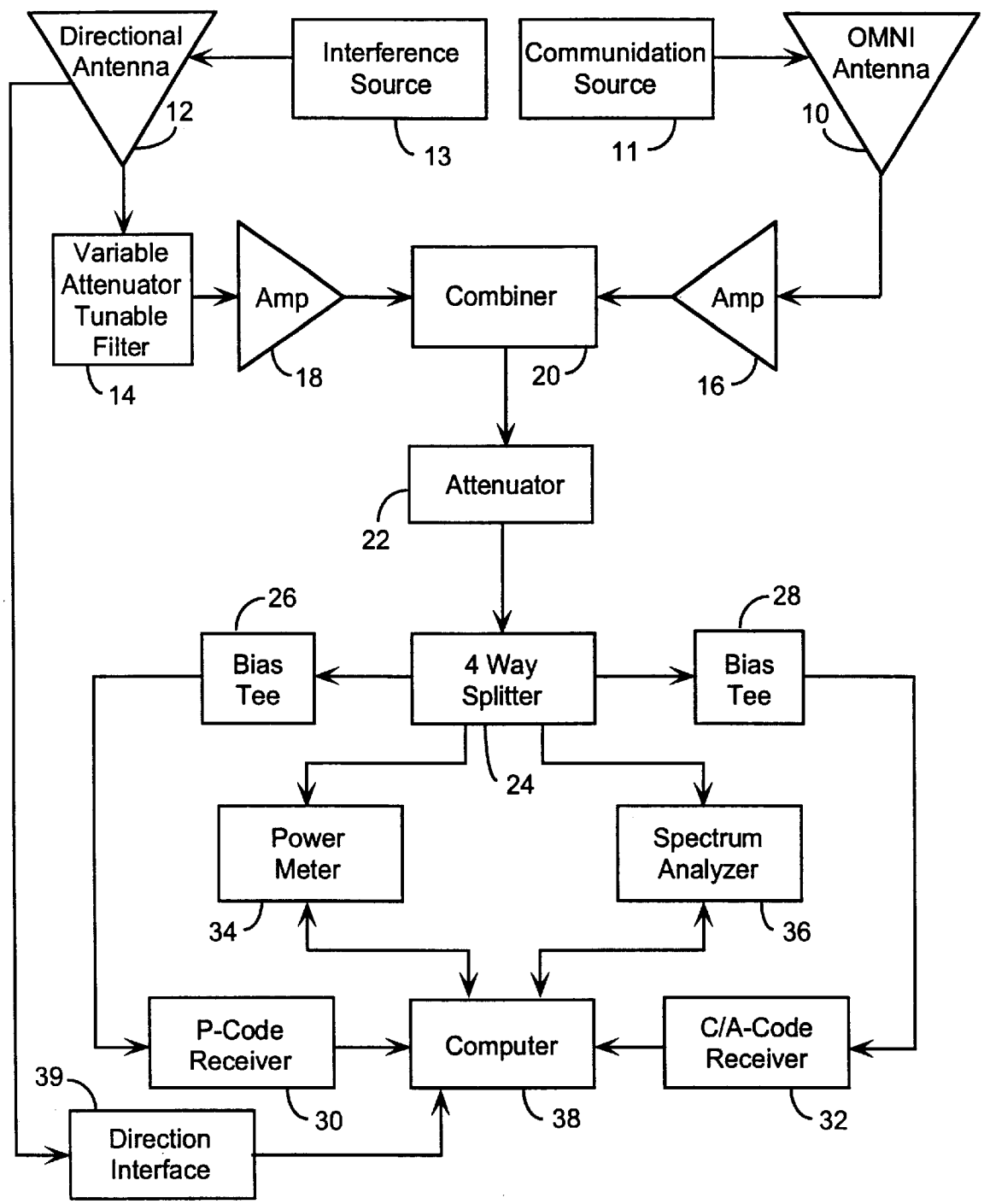
FIG. 1 is a low power interference detection system.
Figure 2:
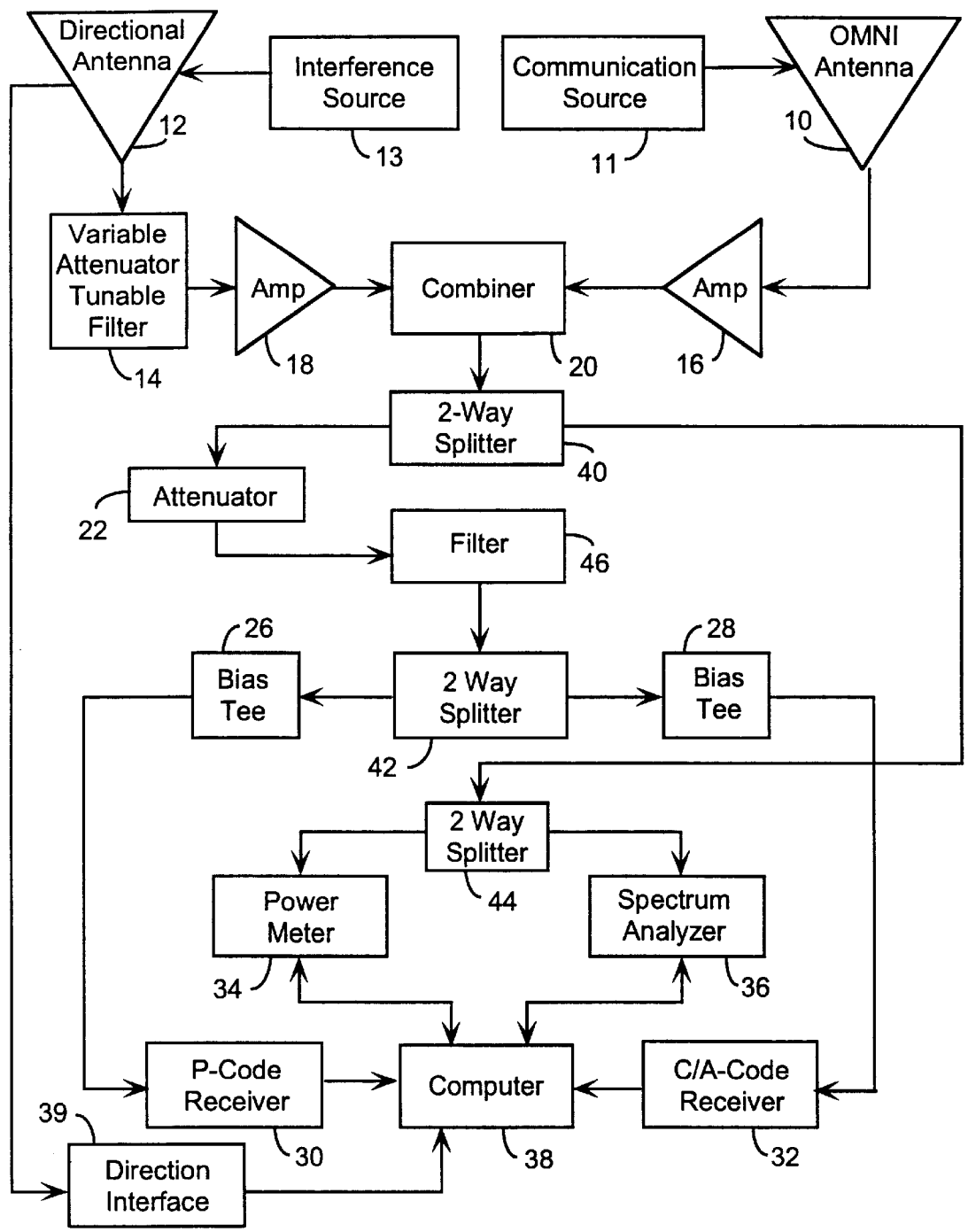
FIG. 2 is a high power interference detection system.

An embodiment of the invention is described with reference to the figures using reference designations as shown in the figures. Referring to FIGS. 1 and 2, an omni antenna 10 is used to receive a communication signal from a communication source 11, such as a remote transmitter or satellite. The communication signal may be intermittently interfered with by an interference signal. A directional antenna 12 is used to receive the interference signal from an interference source 13. The directional antenna 12 has a high gain beam, not shown, that may be pointed in a variety of directions, whereas, the omni antenna has a low gain beam that is pointed in a fixed pointing direction. The directional antenna 12 has a variable attenuator 14 for varying the gain of the directional signal received by the directional antenna 12. The omni antenna 10 and the directional antenna 12 include low noise amplifiers 16 and 18 respectively, which provide respective communication signals and directional signals that are coupled together by a combiner 20. The combiner 20 provides a combined signal to an attenuator 22 which attenuates and communicates the combined signal to a 4-way splitter 24. The 4-way splitter 24 provides the combined signal through bias tees 26 and 28 to one or more receivers 30 and 32, and provides the combined signal to measurement equipment such as a preferred power meter 34 and spectrum analyzer 36. The bias tees 26 and 28 are RF high pass and DC low pass paths to match the inputs of the receivers 30 and 32 to the outputs of the amplifiers 16 and 18. The bias tees 26 and 28 provide receiver input loads isolated from RF signals.

The receivers 30 and 32 and measurement equipment 34 and 36 are used to receive and measure the combined signal provided by the combiner 20. A computer 38 is preferably connected to receivers 30 and 32 and measurement equipment 34 and 36 for computational signal analysis. The computer 38 is also connected to the directional antenna 12 through an interface 39. In the case of the high power interference detection system as shown in FIG. 2, two-way splitters 40, 42 and 44 are used to route the combined signal through the attenuator 22, a filter 46 to the receivers 30 and 32, power meter 34 and spectrum analyzer 36. The attenuator 22 and filter 46 isolate interfering frequencies of interest without over loading the inputs of the receivers 30 and 32. The 2-way splitter 40 is preferably an unequal splitter having low loss path to the receivers 30 and 32 for improved communication signal reception.

In the GPS application, the receivers 30 and 32 are preferably a large bandwidth dual frequency P code GPS receiver 30 and a narrow bandwidth C/A code GPS receiver 32. The receivers 30 and 32 provide for GPS interference analysis at different frequencies and bandwidths. The GPS interference detection system operates by combining received GPS communication signals transmitted from the GPS constellation of transmitting satellites, not shown, received by the omni antenna 10, together with the directional signal from the directional antenna 12. The combined signal from the combiner 20 is received by the receivers 30 and 32 and measured by the meter 34 and analyzer 36. The receivers 30 and 32 provide receiver detection signals to the computer 38. The receiver detection signals indicate the relative strength of the reception of the communication signals to the interfering signal. Typically, the receiver detection signals are at a minimum when the directional antenna 12 is pointed towards the source interference 11, and are at a maximum when the directional antenna 12 is pointed away from the source of interference 13.

The interference detection system operates by combining the communication signals from the GPS constellation with directional signal from a plurality of angular directions. The combined signal from the combiner 20 is received simultaneously by the GPS receivers 30 and 32 for both narrow-band C/A-type signals and wide-band P-type signals and by the spectrum measurement equipment 34 and 36. The directional signals from the rotating directional antenna 12 is added to the communication signal from the omni-directional antenna 10. An increase in interference, that is, a decrease in the communication signal-to-noise ratio, is correlated with the direction of the directional antenna 12 as indicated by the direction interface 39 indicating the direction toward the source of an interfering signal. The spectrum of the interfering signal in the communication signal band may then be recorded and potentially matched to known spectra to identify the source of interference. The final result is directional information and interference signal spectra information that can be used to determine the geographical origin and nature of the source of interference.

The communication signals from the omni antenna 10 are communicated to the preferred low-noise-amplifier 16. The omni antenna 10 is preferably a standard dual-frequency GPS antenna with an approximately hemispherical radiation beam pattern. The amplifier 16 is included to compensate for attenuation due to the attenuators, splitters, and any coaxial cable line loss. The amplifier 16 is typically contained in an antenna housing of the antenna 10. The omni antenna 10 is typically mounted in a fixed position pointing up to track the communication signals from the GPS constellation satellites.

The directional antenna 12 is preferably one of two types of commercially available antennas. The directional antenna may be a standard gain horn antenna that includes the GPS frequencies 1227 to 1575 MHz or a log-periodic antenna such as that typically used for signal identification in the VHF through microwave bands. The directional antenna 12 is preferably rotated at a constant rate, such as one minute sweeps. The directional antenna 12 is used to locate and amplify the directional signal in a direction of an interference source. A motor controlled antenna rotator, not shown, is used to either scan continuously or adjust the direction of the directional antenna 12. A servo or synchronous motor, not shown, may be used to sense the direction of the directional antenna 12 in a preferred digital form that is readable by the computer 38 through the direction interface 39. The directional signal from the directional antenna 12 passes through the variable attenuator 14 that has preferably 1 and 10 dB attenuation steps up to 60 dB of attenuation. The variable attenuator 14 may be used to match the combined signal level to the dynamic range of the receivers 30 and 32.

The attenuator 14 communicates the directional signal to the low noise amplifier 18. The directional signal may be out-of-band of the communication signal from the omni antenna 10. The variable attenuator 14 may include or function as tunable filter in the case of high power interference to enable frequency isolation to a particular harmonic. Once the direction to the interfering source is determined, the tunable passband filter 14 may be applied to the directional signal from the directional antenna to isolate the interference to a desired band.

The directional signals from the directional antenna 12 and the communication signals from the GPS omni antenna 10 are added after appropriate attenuation and amplification by the combiner 20 providing the combined signal. The combiner 20 functions to add the communication signal and the directional signal from the amplifiers 16 and 18, respectively. The combined signal from combiner 20 is attenuated by the fixed attenuator 22 providing the combined signal to the 4-way splitter 24 which distributes the combined signal to the P-code receiver 30 and C/A-code receiver 32 through Bias tees 26 and 28, respectively, as well as to the power meter 34 and spectrum analyzer 36.

The C/A-code receiver 32 is used to detect interference to the GPS communication signal by detecting the interference to the 1.023 MHz rate code at $L_1$. The C/A-code receiver 32 computes a carrier-to-noise ratio, (CNR), which is related to the interference-to-signal ratio (I/S) approximately as I/S equals seventy minus CNR. Interference is indistinguishable from noise in the receiver 32. As the interference increases, the resultant CNR of the communication signal relative to the noise, decreases. The C/A-code receiver 32 is most sensitive to signals in a 2 MHz bandwidth centered around $L_1$. The P-code receiver 30 is used to detect interference to the GPS communication signal by detecting the interference to the 10.23 MHz rate code at $L_1$ and/or $L_2$. The P-code receiver 32 also computes the CNR but is most sensitive to signals in a 20 MHz bandwidth centered around $L_2$. Thus, near-in-band or broadband interference signals may be distinguishable by the comparison of the CNR values of the two receivers 30 and 32. The receivers 30 and 32 communicate CNR values to the computer 38. The GPS receivers 30 and 32 are sensitive GPS interference and are thus used to verify the presence and characteristics of the combined signal that is measured by the power meter 34 and spectrum analyzer 36.

The spectrum analyzer 36 is used to measure the spectral content of the combined signal that is correlated to the reduction in CNR in the receivers 30 and 32. The spectral content of the combined signal may be used to identify the type of interference signal that is causing the interference by displaying the frequency content and modulation of the interfering signal. The power meter 34 is used to detect the total power of the interfering signal. The power meter 34 determines the power content of strong or very broadband sources of interfering signals while the spectrum analyzer 36 provides precise frequency and spectra content measurement.

The two receivers 30 and 32, the power meter 34 and the spectrum analyzer 36 are interfaced with the computer 38. The computer 38 can record power levels over frequency for different directions of the directional antenna 12. By subtracting power levels measured at differing directions and frequency, the computer 38 can determine maximum different power levels at particular frequencies and directions to indicate the presence of the interfering signal when the receiver detection signal is a minima. In addition, directional information is also provided to the computer 38 from the directional antenna 12 using the direction interface 39. The GPS receivers 30 and 32 provide messages containing the CNR measurements, as well as position, time, satellites tracked, and receiver states. The computer software functions to record CNR vs. directional angle data. The power meter 34 provides a single power measurement. The spectrum analyzer 36 provides pairs of frequency and power measurements, as well as messages indicating instrument settings. The computer 38 provides messages to the spectrum analyzer 36 to change settings such as frequency bands, detection bandwidths, and attenuation settings. Computer software computes the I/S as a function of CNR. Real-time software displays a polar graph of average I/S as a function of direction of rotating directional antenna 12. Messages are generated by the computer 38 to indicate total loss of signal in the receivers 30 and 32.

The directional antenna 12 is rotated and directional signals are measured by the spectrum analyzer 36 in the direction of the interference to the GPS receivers 30 and 32. The measured signals are stored by the computer 38. The directional signals in the direction of an interfering source may be further analyzed with the directional antenna 12 fixed in the direction of maximum signal. The computer 38 performs frequency analysis by first determining if the interfering signal is in-band or out-of-band to GPS. The tunable filter 14 has a passband which is tuned through a frequency range. The power of the directional signal within the passband of the tunable filter 14 is measured and displayed through the range. The passband containing the peak interfering signal is detected in the range at the point where the receivers 30 and 32 have the highest CNR measurement. If the I/S response of the receivers 30 and 32 does not change as a function of the bandpass filter tuning, then the source of interference is not in that tuning range and consequently, is a product of out-of-band signals. The computer 38 may be programmed to automatically tune the tunable filter 14 to various passbands and record CNR values. The tunable filter 14 may overlap sub-multiples of the GPS frequencies. The directional antenna 12 may be a log periodic antenna which has a wider bandwidth and thus responds to the low frequencies that are submultiples of the GPS frequencies. Once the interference signal is isolated, the spectrum may be compared to known signatures, such as TV transmissions, to match the source of interference with registered services. These known signatures may be stored in the computer as templates for computer aided recognition. The peak or peaks of the spectrum may be compared to registered frequencies to identify the interfering service.

The directional signal from the directional antenna 12 may include an interfering signal at a marginal level that disrupts reception of the communication signals from the GPS omni antenna 10. The computer 38 correlates the direction of the directional antenna 12 to the point of maximum interference by capturing directional data from the direction interface 39, power data from power meter 34 and spectra data from the spectrum analyzer 36, to then record the angular direction and spectral and power content of the directional signal containing the interfering signal. This directional, power and spectral data can then be used to locate the source of the interfering signal. In this marginal interference operation, the directional antenna 12 is swept to determine the direction to a source of an interfering signal when the directional signal has marginal attenuation and thus maximum amplification relative to the communication signal.

In cases where the interfering source is too far away or is not at an amplitude level to cause marginal interference to the standard GPS receivers 30 and 32, the omni antenna 10 may be pointed toward the suspected source of interference, yet still receive the communication signal. Also, the variable attenuator 14 can be set at a lower level of attenuation to thereby effectively amplify the directional signal relative to the communication signal from the omni antenna 10. When there is a low level of interference, as when the receivers 30 and 32 continuously track and provide undegraded signal-to-noise ratio measurements, as in the absence of an interfering signal, the variable attenuator 14 may be set to a lower level to effectively amplify the directional signal. This amplified direction signal may then be used detect the presence of an source of potential interference. The effectively amplified directional signal may contain the low level interference signal which then interferes with the receivers 30 and 32 reception of the communication signals from omni antenna 10. When such interference occurs by a low level of interference, the directional signal is used to obtain power and spectral data about the source of low potential interference. Hence, during detection of low level interference sources, the directional signal has increased relative gain of the interference signal for power and spectral measurements and directional location. This enables the detection of potentially interfering signals and sources.

During low level interference, there may be no apparent interference detected by standard gain GPS receivers using the standard GPS antenna. The attenuator 14 may be set to zero attenuation to increase the directional signal to produce a loss of signal tracking. When a loss of signal track is detected, directional signal attenuation of attenuator 14 is increased until signal tracking returns. The attenuation of the variable attenuator 14 is adjusted until there is a consistent peak in the polar directional graph. The angle corresponding to the peak is the direction of the source of the interfering signal. The above procedure may be repeated at multiple geographical locations until sufficient angles to the source can be used to determine the location using conventional triangulation techniques.

When there is a high level of interference as when the receivers 30 and 32 do not track and do not provide signal to noise ratio measurements, the directional signal may be greatly attenuated by the variable attenuator 14 to severely attenuate the directional signal and therefore severely attenuate the interference signal relative to the communication signal. The attenuated interference signal may then cause marginal blockage of communication signal reception by the receivers 30 and 32 and may then used to verify the presence of the strong external source of interference. The effectively attenuated directional signal now contains a sufficiently low level of interference which then marginally interferes with the receivers 30 and 32 reception of the communication signals from omni antenna 10. When such marginal interference occurs by a marginal level of interference, the directional, data is used to locate the strong source of interference. Hence, during detection of high level interference, the directional signal has increased attenuation relative to the communication signal for improved communication signal reception to then enable directional location. This process enables the detection of strong interfering signals and sources.

When there is a very high level interference as when the receivers 30 and 32 yield no tracking information at all when the attenuator 14 provides maximum attenuation, the system is altered to provide in-band filtering of the directional signal. When attenuation reduction of the interference level is insufficient to provide marginal reception by the receivers 30 and 32, the combined signal is split by a splitter 40 as shown in FIG. 2. The combined signal is filtered by the filter 46 prior to reception by only the receivers 30 and 32. The filter 46 is used to pass only in-band signals to reduce the level of interference to the receivers 30 and 32. The filter 46 may be used to reduce interference having frequencies in or near the receiver passband. Setting the filter passband in or near the receiver passband results in an increase of signal-to-noise ratio as the filter passband indicates the frequencies of the interference signal. The combined signal is still routed to the power meter 34 and spectrum analyzer 36 to measure the power and spectral content of the combined signal, but the receivers 30 and 32 received attenuated and in-band filter signals so that the receivers 30 and 32 can now marginally receive the communication signal to provide tracking information. The directional antenna 12 may also be used to initially locate interference and the communication signals in the direction of the GPS satellites. The omni antenna 10 may also be pointed away from a suspected source of interference yet still receive the GPS communication signal. The GPS omni antenna 10 may be provided with automatic control means, not shown, driven by the computer 38 to reorient the omni antenna 10 away from very strong sources of interference yet still receive the GPS communication signal. In this way, the GPS signal can be reacquired and a signal to noise determination be made by the receivers 30 and 32. This reorientation increases the range over which measurements of interference can be made in a field survey. Additionally, the simultaneous use of GPS receivers 30 and 32 and the spectrum analyzer 36 can help isolate the interference signal of interest in exceedingly noisy environments.

During very high level interference detection, the high gain omni antenna 10 is preferably pointed towards the source of the communication signal such as a GPS satellite when the standard GPS receivers are unable to acquire or track GPS signals presumably due to a strong local interfering source. Also, the directional antenna 12 may be stepped at angular increments, such as in fifteen degree increments with nominal dwell times, for example two minute dwell times, at each incremented angular position stop. The dwell time allows the GPS receivers 30 and 32 to acquire and track satellites with the added gain of the directional antenna 12 when most of the interfering signal is not in the directional beam and a substantial portion of the communication signal is within the directional beam. The combined signals are measured and recorded. The I/S ratio is computed and plotted as a function of angle by the computer 38. A directional increment to the communication source is determined by the peak in the plot. If the GPS receivers 30 and 32 are unable to lock at all, additional measurements are taken at other locations. The additional measurements should be taken at distances further away from the suspected source of the interference signal in noisy signal environments. The nature and precise direction of the interfering signal may not be distinguishable if the GPS receivers 30 and 32 cannot regain lock. The additional measurements may lead to receivers lock at a point far removed from the source of interference.

The interference detection system has four primary preferred modes of operation for detecting marginal, low, high and very high levels of interference as discussed. The attenuation, amplification or gain of the system components are adjusted so that the receivers 30 and 32 marginally track the communication signal so that directional information can be obtain when the receiver sense low CNR or lose tracking when the directional antenna 12 is pointing toward the source of interference. When detecting marginal levels of interference, the attenuation of the directional signal is set at a nominal value. When detecting very high levels of interference, the directional signal is attenuated and filtered in-band for improved isolation of the very high interfering signal.

The directional interference measurement system can be used to locate sources of interference. The directional system can also be used for calibrating receivers located at monitoring stations in the field or integrated on aircraft. An airborne application includes airborne surveillance of GPS interference signals. An aircraft is equipped with the two antennas 12 and 10 pointed in fundamentally different directions. A standard GPS antenna 10 is preferably mounted on the upper surface of the aircraft and the directional antenna 12 is preferably mounted on the bottom on a rotating mount. The rotating directional antenna 12 scans for interference during airborne surveillance. The combination of directional, power and spectrum data measurements from a plurality of locations during a flight may be used for high quality triangulation to identify the source of the interfering signal.

The interference detection method uses a directional antenna beam providing a directional signal including an interference signal, and a omni antenna beam providing a communication signal, which are combined as a combined signal. By setting appropriate attenuation and amplification levels, marginal reception of the communication signal can be affected such that the loss or degradation of reception indicates the presence of the interference and the direction of the directional antenna beam indicates the direction toward the source of interference. In this manner, the presence of an interfering signal and the direction toward the interfering source can be determined. Those skilled in the art may recognize further improvements and equivalent functions. For example, during low level interference detection, decreasing the attenuation from a very high level of attenuation until the point of marginal reception is reached, is the same as increasing the attenuation from a very low level of attenuation until the point of marginal reception is reached. This method is also suitable for direction determination.

The present invention includes a method of combining interference signals and communication signals from respective beams. The present invention is preferably adapted to detect in-band interference sources, but out-of-band interferences sources, such as those causing in-band harmonics, could be detected as well by recording out-of-band power and spectrum levels correlated to reception outage. Further still, the computer 38, power meter 34, and spectrum analyzer 36 could be adapted to search through a series of bandwidth when searching for sources of potential interference, using the filters 14 and 46 to isolate frequencies passbands of interest. Those skilled in the art can make enhancements, improvements and modifications to enhance the invention. However, those enhancements, improvements and modifications may nonetheless fall within the spirit and scope of the following claims.

What is claimed is:

1. A method for detecting the direction to an interference source generating an interfering signal interfering with a communication signal from a communication source, the method comprising the steps of, receiving the interfering signal within a first receiving antenna beam pointed in a plurality of directions, providing respective directional signals comprising the interfering signal at respective interference levels at respective directions of the first receiving antenna beam relative to the interference source, receiving the communication signals through a second antenna receiving beam at a communication level from the communication source, combining the directional signal with the communication signal, tracking the communication signal within the combined signal to provide a tracking indicator indicating the respective interference levels and the communication level, detecting changes in the tracking indicator indicating the presence of interference, and determining the direction toward the interference source when interference is present.

2. The method of claim 1 wherein the interfering signal receiving step includes the steps of, sweeping the first antenna receiving beam in a plurality of directions for receiving the interfering signal at respective interfering levels at the respective plurality of directions, and providing respective directional outputs indicating the respective direction of the first antenna receiving beam contemporaneously with providing the respective directional signals.

3. The method of claim 1 further comprising the step of, pointing the second antenna receiving beam in a fixed direction to receive the communication signal from the communication source.

4. The method of claim 1 further comprising the steps of, sweeping the first antenna receiving beam in the plurality of directions for receiving the interfering signal at the respective interfering levels, providing respective directional outputs indicating the respective direction of the first antenna receiving beam contemporaneously with providing the respective directional signals, and providing a representation of the combined signals, and representation of the combined signal when the interference is present.

5. The method of claim 1 wherein, the communication signals are GPS communication signals, and the interfering signal produces spectra within a frequency band of the GPS communication signals.

6. A method for detecting the direction toward an interference source generating an interfering signal interfering with a communication signal from a communication source, the method comprising the steps of, sweeping a first antenna receiving beam in a plurality of directions for receiving the interfering signal at respective interfering levels, providing respective directional outputs indicating the respective angular direction of the first antenna receiving beam contemporaneously with providing respective directional signals, receiving the interfering signal with the first antenna beam pointed in a plurality of directions, providing respective directional signals which comprise the interfering signal at respective interference levels at respective directions, adjusting the directional signals to adjust the interference levels to be above a threshold level, pointing a second antenna receiving beam in a fixed direction to receive the communication signal from the communication source, receiving the communication signal at a communication level from the communication source, combining the directional signal with the communication signal, tracking the communication signal within the combined signal to provide a tracking indicator indicating the respective interference levels and the communication level, detecting changes in the tracking indicator indicating the presence of interference, and determining the direction to the interference source when interference is present.

7. The method of claim 6 further comprising the steps of, providing a representation of the combined signal, and storing the respective directional outputs and the representation of the combined signal when interference is present.

8. The method of claim 6 wherein, the tracking is performed by a GPS receiver, the determining step is performed by a programmed computer, the first antenna receiving beam is provided by a swept directional antenna providing angular directional signals to the programmed computer, the second antenna receiving beam is provided by an omni antenna, the communication signal is a GPS communication signal.

9. A method for detecting the direction toward an interference source generating an interfering signal interfering with a GPS communication signal from a GPS communication satellite, the method comprising the steps of, sweeping a directional receiving beam in a plurality of directions for receiving the interfering signal at respective interfering levels, receiving the interfering signal at the respective interfering levels within the directional receiving beam in a respective plurality of directions, providing respective directional signals which comprise the interfering signal at the respective interference levels at the respective directions, providing respective directional outputs indicating the respective directions of the directional receiving beam contemporaneously with providing the respective directional signals, pointing a GPS receiving beam in a fixed direction towards the GPS communication satellite, receiving the GPS communication signal at a communication level from the GPS communication satellite, combining the directional signals with the communication signal providing a combined signal, tracking the communication signal within the combined signal to provide a tracking indicator indicating the respective interference levels and the communication level, detecting changes in the tracking indicator indicating the presence of interference, and determining the direction toward the interference source when interference is present, providing a representation of the combined signal, and storing the respective directional outputs and the representation of the combined signal when interference is present.

* * * * *